(12) United States Patent
Mishra et al.

(10) Patent No.: US 7,747,861 B2
(45) Date of Patent: Jun. 29, 2010

(54) METHOD AND SYSTEM FOR REDUNDANT SECURE STORAGE OF SENSITIVE DATA BY USING MULTIPLE KEYS

(75) Inventors: Chandan Mishra, Sunnyvale, CA (US); Fabio Maino, Palo Alto, CA (US); Anand Hariharan, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1156 days.

(21) Appl. No.: 11/270,155

(22) Filed: Nov. 9, 2005

(65) Prior Publication Data

US 2007/0106911 A1 May 10, 2007

(51) Int. Cl.
*H04L 9/32* (2006.01)
(52) U.S. Cl. .................... 713/172; 380/281
(58) Field of Classification Search ................ 380/281; 713/172
See application file for complete search history.

(56) References Cited

U.S. PATENT DOCUMENTS

| | | | | |
|---|---|---|---|---|
| 4,650,975 A * | 3/1987 | Kitchener | .................... | 235/375 |
| 4,802,218 A * | 1/1989 | Wright et al. | .................. | 705/60 |
| 4,900,903 A * | 2/1990 | Wright et al. | ................ | 235/380 |
| 5,227,613 A * | 7/1993 | Takagi et al. | ................ | 235/380 |
| 5,309,516 A * | 5/1994 | Takaragi et al. | ................ | 380/45 |
| 5,428,685 A * | 6/1995 | Kadooka et al. | ............. | 713/190 |
| 5,526,428 A * | 6/1996 | Arnold | ........................ | 713/159 |
| 5,761,309 A * | 6/1998 | Ohashi et al. | ................ | 713/156 |
| 5,878,134 A * | 3/1999 | Handelman et al. | .......... | 340/5.6 |
| 6,002,605 A * | 12/1999 | Iwasaki et al. | ................. | 365/51 |
| 6,137,710 A * | 10/2000 | Iwasaki et al. | ................. | 365/52 |
| 6,612,486 B2 * | 9/2003 | Sato et al. | .................... | 235/375 |
| 7,206,847 B1 * | 4/2007 | Alberth et al. | ............. | 709/229 |
| 7,360,091 B2 * | 4/2008 | Aikawa et al. | ............. | 713/172 |
| 7,376,839 B2 * | 5/2008 | Carta et al. | .................. | 713/185 |
| 7,661,001 B2 * | 2/2010 | Higurashi | .................... | 713/193 |
| 2002/0186838 A1 * | 12/2002 | Brandys | ...................... | 380/30 |
| 2003/0111528 A1 * | 6/2003 | Sato et al. | .................... | 235/380 |
| 2004/0025021 A1 * | 2/2004 | Aikawa et al. | ............. | 713/172 |
| 2004/0059685 A1 * | 3/2004 | Sakamura et al. | ............. | 705/65 |
| 2004/0256470 A1 * | 12/2004 | Takami et al. | ............... | 235/492 |
| 2005/0069139 A1 * | 3/2005 | Higurashi | .................... | 380/284 |
| 2005/0086479 A1 * | 4/2005 | Ondet et al. | ................. | 713/172 |
| 2006/0026428 A1 * | 2/2006 | Schrijen et al. | ............. | 713/171 |
| 2006/0179309 A1 * | 8/2006 | Cross et al. | ................. | 713/168 |
| 2006/0210080 A1 * | 9/2006 | Tuyls et al. | ................. | 380/274 |
| 2007/0226513 A1 * | 9/2007 | Handa et al. | ................. | 713/186 |
| 2008/0109371 A1 * | 5/2008 | Sakamura et al. | ............. | 705/67 |
| 2008/0313464 A1 * | 12/2008 | Fascenda et al. | ............ | 713/171 |

* cited by examiner

*Primary Examiner*—David García Cervetti
(74) *Attorney, Agent, or Firm*—Trellis IP Law Group, PC (57) ABSTRACT

A method and apparatus for secure storage of data by using redundant keys is provided. The method includes encrypting a data set by using a master key, which can be encrypted by different sync keys. Sync keys can be generated by different supervisor cards. Thereafter, the encrypted master key and the encrypted data set can be stored in a memory. Further, credentials stored in one of the supervisor cards can be encrypted and transferred to other supervisor cards, to provide redundancy of supervisor cards.

20 Claims, 5 Drawing Sheets

METHOD AND SYSTEM FOR REDUNDANT SECURE STORAGE OF SENSITIVE DATA BY USING MULTIPLE KEYS

BACKGROUND OF THE INVENTION

1. Field of Invention

Embodiments of the invention relate, to security systems in general. More specifically, the embodiments of the invention relate to methods and systems for smart card based security in networks.

2. Description of the Background Art

A computer network that is continually accessed for information and services by its users may be referred to as a high availability network. However, with the high availability of information stored over the networks, it is important to prevent unauthorized access to the stored information. Smart cards can provide security for sensitive information by storing a master key inside them. The master key is used to encrypt sensitive data stored outside the smart card.

Many network devices use smart cards to provide secure storage of information associated with a given supervisor card (SUP). These network devices use an active SUP and a standby SUP to provide high availability through redundancy. To provide redundancy, all the credentials and the master key stored inside the active SUP are synchronized to the standby SUP. However, one of the constraints for the synchronization of the two SUPs is the manner in which the smart cards are designed. The smart cards are so designed that they do not allow the extraction of sensitive information and the master key(s) stored in them.

According to one of the conventional methods, manual intervention of an administrator is required to synchronize the two SUPs. In this case, the administrator re-configures all the information, in order to replace a SUP with its standby. The re-configured information is then stored in the active SUP as well as the standby SUP.

Another conventional method for the synchronization of the SUPs involves generating a new master key for the standby SUP. In this case, all the information is re-encrypted with the new master key. The re-encrypted information is stored along with the previously encrypted information.

According to another conventional approach for synchronization of SUP, when a new SUP is used, it is possible to re-generate the sensitive credentials on both the SUPs. Re-generation is possible due to a mechanism that makes credentials transparent to the administrator.

However, re-configuration of credentials in accordance with the new master key adds to the complexity in the management of the redundant high availability networks. Moreover, an additional involvement from the administrator is required for re-configuration. Further, re-encrypting the credentials requires an extra amount of memory. The entire process leads to additional expenses and complexity in the network. Moreover, re-generation of credentials is not possible in systems where seamless provision of credentials is not possible.

DETAILED DESCRIPTION OF EMBODIMENTS OF THE INVENTION

The embodiments of the invention provide a method, a system, and a computer-readable medium for secure storage of data in a redundant system. The redundant system can be designed for high availability in case of failure of one of the redundant system components. The various embodiments of the invention provide a method for secure storage of data by using redundant keys. The data to be secured, such as credentials used for authentication, authorization, or confidentiality, is encrypted using a master key, which can be generated by an active supervisor card. A master key can further be encrypted by two different sync keys that provide redundancy in storage of data. Sync keys can be generated by two different supervisor cards and securely stored on each of the supervisor card. One of the supervisor cards can be an active card while the other can be a standby card. Moreover, the encrypted master key and the encrypted data can be stored in a memory. Credentials and other data to be stored in the active supervisor card can be encrypted and sent to the standby supervisor card. The standby supervisor card decrypts and stores the credentials in its memory.

Figure 1:
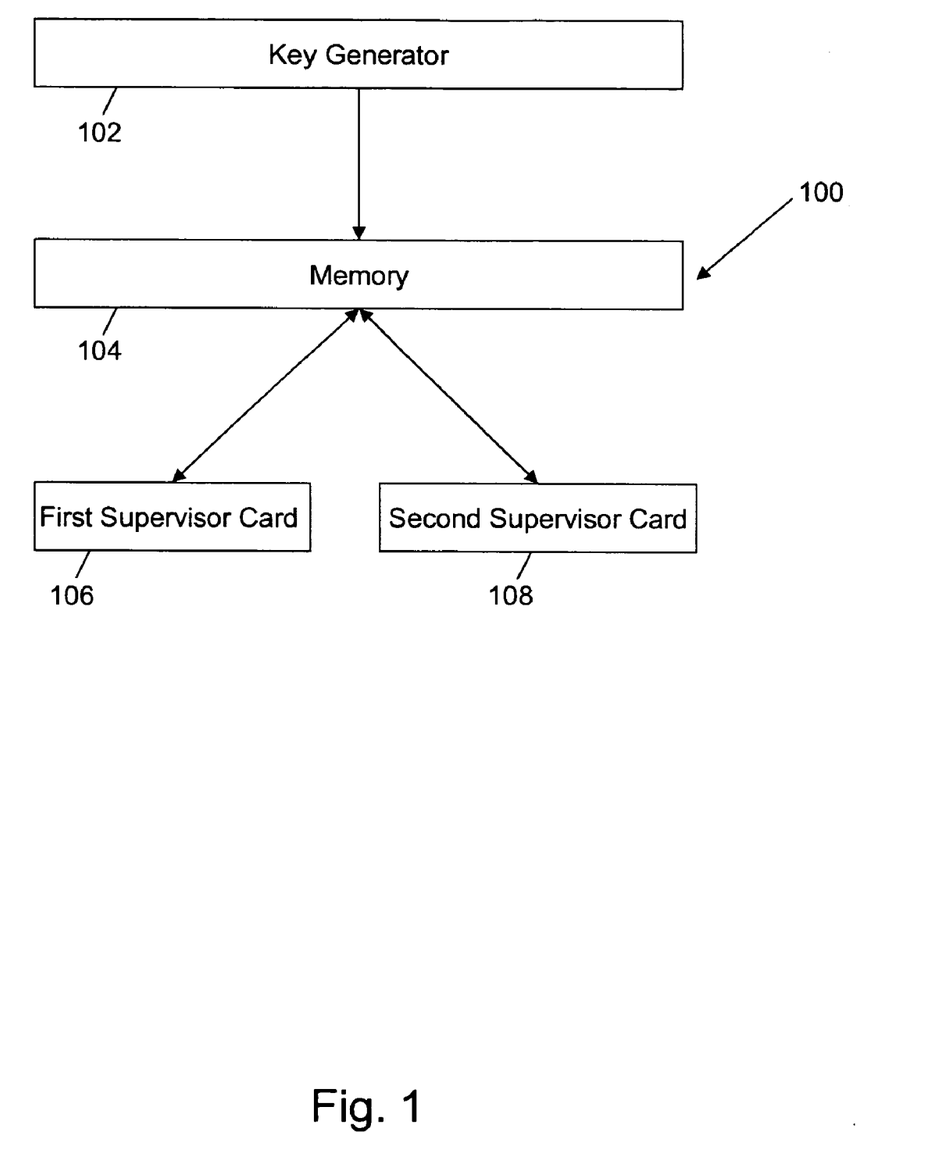
FIG. 1 illustrates an environment for implementing an exemplary embodiment of the present invention.

Referring now to FIG. 1, there is seen an environment 100 for implementing an exemplary embodiment of the present invention. Environment 100 includes a key generator 102, a memory 104, a first supervisor card 106, and a second supervisor card 108. Key generator 102 can generate a key. The key generated by key generator 102 can be used to encrypt data that requires to be secured. In one embodiment of the invention, key generator 102 can be a software module embedded in hardware or a combination of hardware and software. The software module can be written in any of the computer programs, such as C++, C, Java, and an equivalent thereof. Encrypted data can be stored in memory 104. In addition, memory 104 can be used to store the encrypted keys. According to various embodiments, memory 104 can be a storage device that can be a hard drive, a Random Access Memory (RAM), or any equivalent thereof. The encryption of the data can be done by a supervisor card. For example, first supervisor card 106 can be used to encrypt the data. Further, first supervisor card 106 can be used to generate keys. Keys can be used to encrypt and decrypt data. A standby supervisor card can be used as a backup for an active supervisor card. The standby card ensures redundancy of supervisor cards, making the system more reliable in the event of the failure of an active supervisor card. For example, second supervisor card 108 can be a standby card for first supervisor card 106. In an embodiment of the invention, second supervisor card 108 can also generate keys that can be used to encrypt the data.

Figure 2:
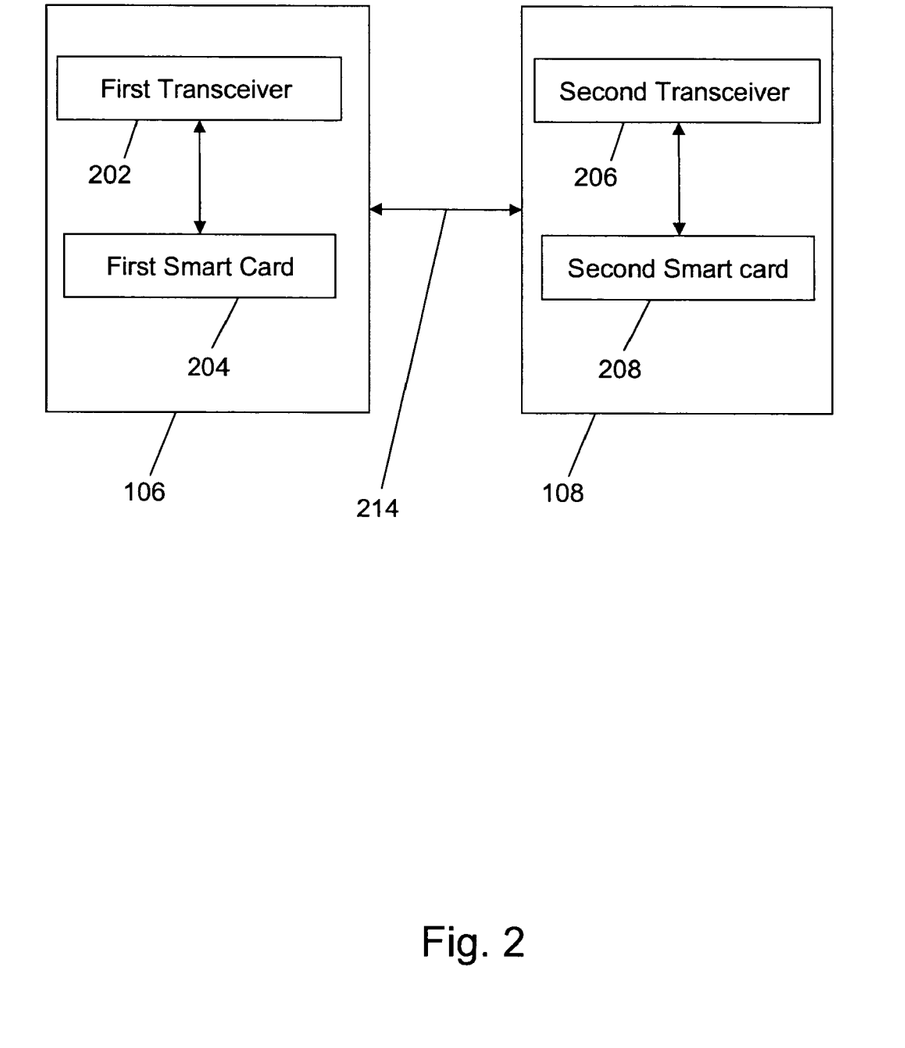
FIG. 2 illustrates two supervisor cards connected to each other, in accordance with an exemplary embodiment of the invention.

Referring now to FIG. 2, there are seen first and second supervisor cards 106 and 108, in accordance with an exemplary embodiment of the invention. The connection 214 between first supervisor card 106 and second supervisor card 108 can be a wired connection, a wireless connection, or a combination of both. First supervisor card 106 includes a first transceiver 202 and a first smart card 204. Similarly, second supervisor card 108 includes a second transceiver 206 and a second smart card 208. In one embodiment of the invention, first and second transceivers 202 and 206 each can be a device that has a transmitter and a receiver combined into a single unit. In an embodiment of the invention, first transceiver 202 acts as an interface for data transfer between first smart card 204 and second supervisor card 108. Further, first smart card 204 transmits and receives data to and from memory 104 by using first transceiver 202. In various embodiments of the invention, a smart card can be a microprocessor card with various tamper-resistant properties, such as a secure file system, human-readable features, and the ability to provide security services, such as confidentiality of information in the memory. Similarly, second transceiver 206 can act as an interface for data transfer between memory 104, first supervisor card 106, and second smart card 208. First and second smart cards 204 and 208 each can be used to encrypt, decrypt and store data. Additionally, first and second smart cards 204 and 208 each can also be used to generate keys to encrypt and decrypt data.

Figure 3:
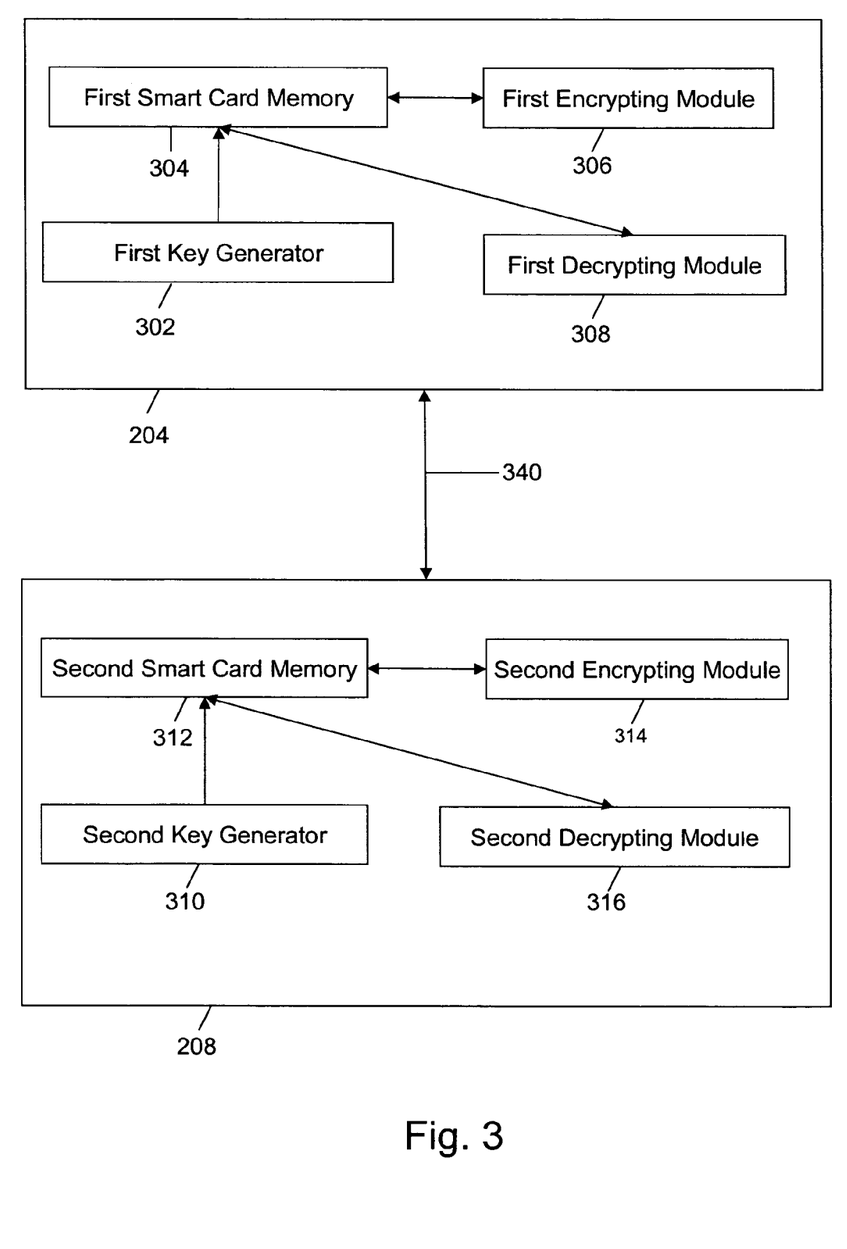
FIG. 3 illustrates two smart cards connected to each other, in accordance with an exemplary embodiment of the invention.

Referring now to FIG. 3 there is seen a connection 340 between first and second smart cards 204 and 208, in accordance with an exemplary embodiment of the invention. In an embodiment of the invention, the connection 340 between first and second smart cards 204 and 208 can be a wired connection, a wireless connection, or a combination of both. Additionally, in one embodiment of the invention, the connection 340 between first and second smart cards 204 and 208 can be an indirect connection, using first and second transceivers 202 and 206. First smart card 204 includes a first key generator 302, a first smart card memory 304, a first encrypting module 306, and a first decrypting module 308. Similarly, second smart card 208 includes a second key generator 310, a second smart card memory 312, a second encrypting module 314, and a second decrypting module 316. In an embodiment of the invention, first key generator 302 generates keys that can be used to encrypt data, which is to be made secure. In one embodiment of the invention, first key generator 302 can be a software module embedded in hardware or a combination of hardware and software. Encrypted data can also be stored in first smart card memory 304. Further, first smart card memory 304 can be used to store the keys generated by first key generator 302. According to various embodiments, first smart card memory 304 is a storage device that can be a flash memory card, a Random Access Memory (RAM), or any equivalent thereof. Additionally, in an embodiment of the invention, encryption of the data by the keys generated by first key generator 302 can be carried out by first encrypting module 306. Decryption of the encrypted data stored in first smart card memory 304, or received by first smart card 204, can be conducted by using first decrypting module 308. Similarly, second key generator 310 generates keys that can be used to encrypt data, which is to be secured. Further, encrypted data can be stored in second smart card memory 312. In addition, second smart card memory 312 can be used to store the keys generated by second key generator 310. Further, in an embodiment of the invention, encryption of data by the keys generated by second key generator 310 can be carried out by second encrypting module 314. Moreover, the encrypted data stored in second smart card memory 312, or received by second smart card 208, can be decrypted by using second decrypting module 316. In an embodiment of the invention, first and second encrypting modules 306 and 314 and first and second decrypting modules 308 and 316 can be software modules embedded in hardware.

Figure 4:
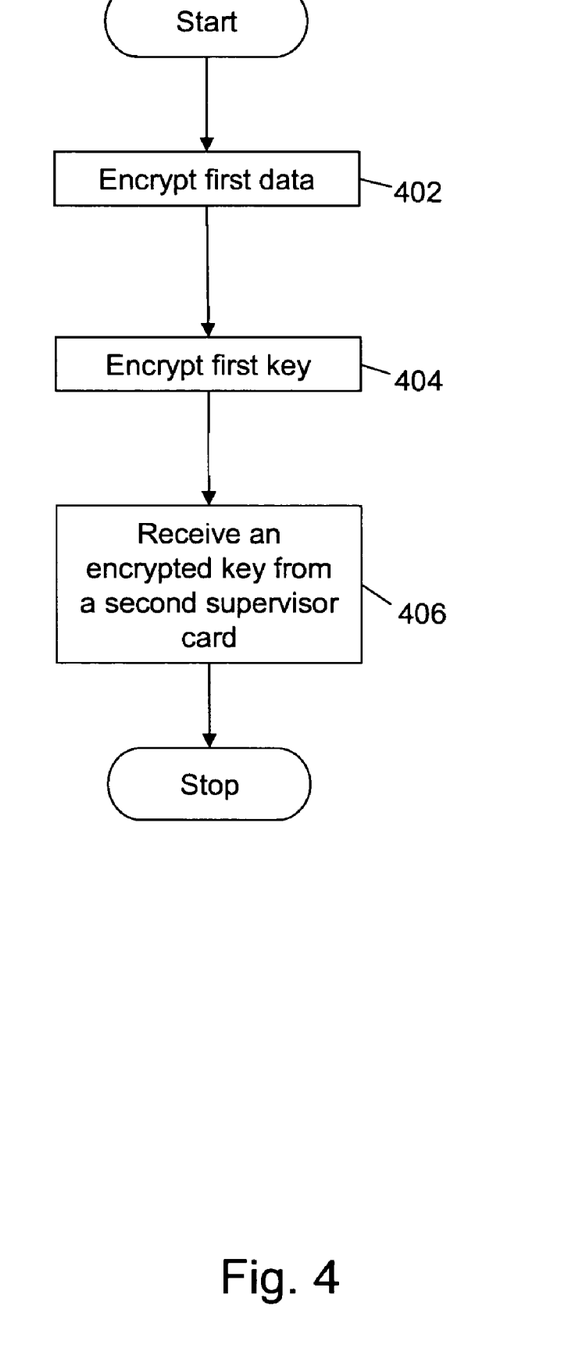
FIG. 4 illustrates a flowchart pertaining to the secure storage of data by using redundant keys, in accordance with an exemplary embodiment of the invention.

FIG. 4 illustrates the flowchart pertaining to the secure storage of data by using redundant keys, in accordance with an exemplary embodiment of the invention. At step 402, encryption of first data is conducted by using a first key, which can be a master key. For example, the first data can be the data that has to be securely stored in a memory. In one embodiment of an invention, the master key can be generated by key generator 102. Moreover, the master key can be generated by first key generator 302 of first smart card 204. In an embodiment of the invention, encryption of the first data by the master key is carried out by first encrypting module 306 of first smart card 204. At step 404, the master key is encrypted by a second key. The second key can be sync key, hereinafter referred to as SKEY1. In one embodiment of an invention, SKEY1 is generated by first key generator 302 of first smart card 204. Further, the encryption of the master key by SKEY1 is carried out by first encrypting module 306. At step 406, a second encrypted key is received from second supervisor card 108. In an embodiment of the invention, the second encrypted key is formed by encryption of the master key by a third key. The third key can be another sync key, hereinafter referred to as SKEY2. SKEY2 can be generated by second key generator 310 of second smart card 208. In an embodiment of the invention, the second encrypted key is received by first transceiver 202 of first supervisor card 106.

In another embodiment of the invention, SKEY1 and SKEY2 each comprise a pair of asymmetric public and private key. For example, SKEY1 comprises a public key SKEY1_PUB and a private key SKEY1_PRIV. Similarly, SKEY2 comprises a public key SKEY2_PUB and a private key SKEY2_PRIV. Further, SKEY1_PUB is transferred to and stored in second supervisor card 108 and SKEY2_PUB is transferred to and stored in first supervisor card 106.

Figure 5:
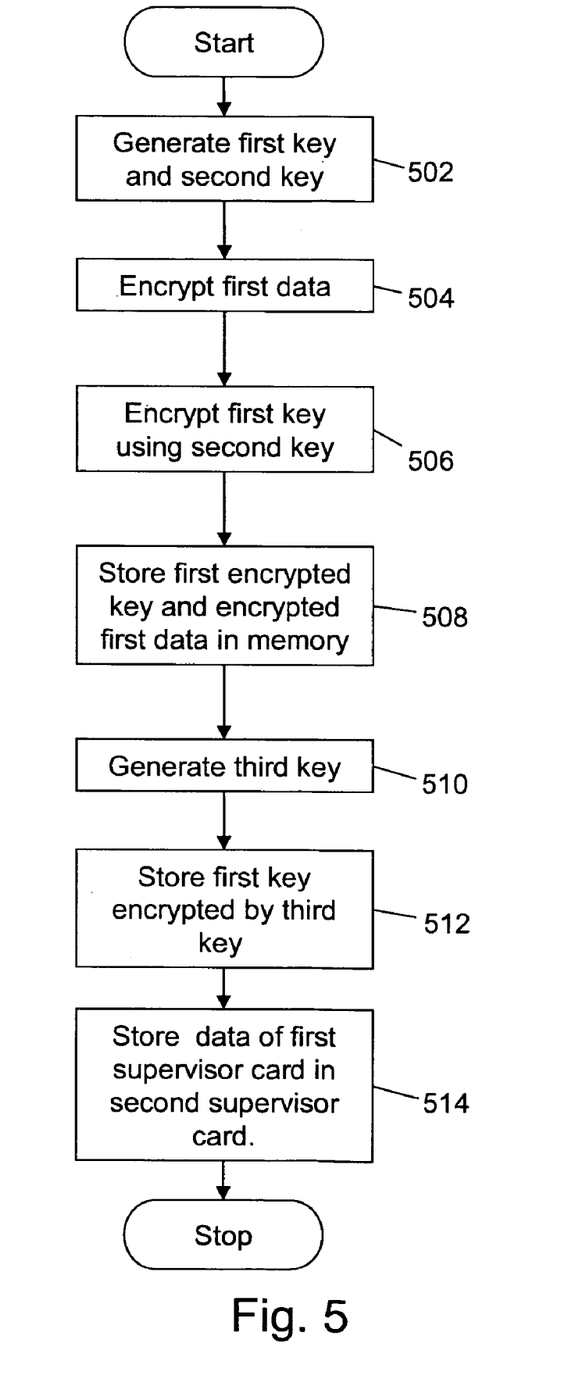
FIG. 5 illustrates a flowchart pertaining to the secure storage of data by using redundant keys, in accordance with another exemplary embodiment of the invention.

FIG. 5 illustrates a flowchart pertaining to the secure storage of data by using redundant keys, in accordance with an exemplary embodiment of the invention. At step 502, a first key and a second key are generated. The first key can be a master key and the second key can be a sync key, hereinafter referred to as SKEY1. In an embodiment of the invention, the master key can be generated by key generator 102. Moreover, the master key can be generated by first key generator 302 of first smart card 204. In an embodiment of the invention, SKEY1 can be generated by first key generator 302. Further, SKEY1 can be stored in first smart card memory 304 of first smart card 204. At step 504, first data is encrypted by the master key. In the embodiment of the invention, the first data can be received by first transceiver 202. Further, the first data is encrypted by using the master key by first encrypting module 306. At step 506, the master key is encrypted by using SKEY1 to form a first encrypted key. In an embodiment of the invention, encryption of the master key by using SKEY1 is carried out by first encrypting module 306 of first smart card 204. At step 508, the first encrypted key and the encrypted data is stored in a memory. In an embodiment of the invention, the first encrypted key and the encrypted first data is transmitted to memory 104 by first transceiver 202. Further, the encrypted first data is stored in memory 104. Additionally, the first encrypted key is stored in memory 104. At step 510, a third key is generated, which can also be a sync key, hereinafter referred to as SKEY2. In an embodiment of the invention, SKEY2 can be generated by second key generator 310 of second smart card 208. Further, SKEY2 is stored in second smart card memory 312 of second smart card 208. At step 512, a second encrypted key is stored, which is formed by encrypting the master key by using SKEY2. In an embodiment of the invention, first smart card 204 receives the first encrypted key through first transceiver 202. Further, first decrypting module 308 decrypts the first encrypted key by using SKEY1. The decrypted first encrypted key is the same as the master key. The master key is encrypted by SKEY2_PUB. The encrypted master key is transmitted to second smart card 208 and received by second transceiver 206 of second supervisor card 108. Further, the encrypted master key received by second transceiver 206 is decrypted by SKEY2_PRIV forming the master key. In an embodiment of the invention, the master key is encrypted by SKEY2. For example, second encrypting module 314 of second smart card 208 encrypts the master key by using SKEY2. In an embodiment of the invention, the second encrypted key is stored in memory 104. At step 514, second data stored in first supervisor card 106 is stored in second supervisor card 108. In an embodiment of the invention, the second data is encrypted by the master key. For example, second encrypting module 306 encrypts the second data by using the master key. The encrypted second data is transmitted by first transceiver 202. In an embodiment of the invention, the second encrypted key is also transmitted to the second transceiver 206. On receiving the second encrypted key, the second encrypted key is decrypted by using SKEY2 by second decrypting module 316 of second smart card 208, to generate the master key. The master key is used to decrypt the received encrypted second data. In an embodiment of the invention, second decrypting module 316 decrypts the encrypted second data by using the master key. The second data is stored in second smart card memory 312 of second smart card 208.

Embodiments of the present invention have the advantage that to add an extra supervisor card, only one encrypted copy of the first key is to be added. Therefore, less memory space is required per addition of redundant supervisor cards. Moreover, when an additional supervisor card is added, the new supervisor card can access information stored in other supervisor cards without the intervention of the administrator. Sensitive information, such as keys and credentials, cannot be accessed from the supervisor card; only the encrypted copy of the information is retrieved from supervisor cards. This makes the system more secure. In an embodiment of the invention, the administrator is not required to reconfigure supervisor cards. Therefore, a seamless credential provisioning mechanism is not required.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer-readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for secure storage of data using multiple keys, the method comprising:
   encrypting first data in a first smart card using a first key, wherein the first data is to be securely stored in a memory coupled to first and second supervisor cards, the first supervisor card having the first smart card and the second supervisor card having a second smart card, the first key being a master key generated by the first supervisor card;
   encrypting the first key in the first smart card using a second key to form a first encrypted key, the second key being a first sync key generated by the first supervisor card; and
   receiving in the first smart card, a second encrypted key from the second smart card, wherein the second encrypted key is formed by encrypting the first key using a third key, the third key being a second sync key generated by the second supervisor card.

2. The method of claim 1, further comprising:
   storing the first encrypted key in the memory; and
   storing the second encrypted key in the memory.

3. The method of claim 2, further comprising storing the encrypted first data in the memory.

4. The method of claim 1, further comprising:
   generating the second key using the first smart card; and
   generating the third key using the second smart card.

5. The method of claim 4, wherein the generating the third key further comprises:
   deriving a third encrypted key by using a public key to encrypt a decrypted first key, wherein the decrypted first key is generated by the first smart card, the third key comprising the public key; and
   sending the third encrypted key to the second smart card.

6. The method of claim 5, wherein the sending the third encrypted key comprises sending the third encrypted key from the first smart card to the second smart card.

7. The method of claim 5, further comprising:
   decrypting the third encrypted key using a private key, wherein the third key comprises the private key.

8. The method of claim 4, wherein the generating the second key further comprises:
   storing the second key in the first smart card.

9. The method of claim 4, wherein the generating the third key further comprises:
   storing the third key in the second smart card.

10. The method of claim 1, further comprising:
    receiving second data in the second smart card, wherein the second data is encrypted by the first key and stored on the first smart card.

11. The method of claim 1, further comprising:
    generating the first key using the first smart card.

12. The method of claim 1, further comprising:
    generating the first key using a key generator in the first smart card.

13. A system for secure storage of data using multiple keys, the system comprising:
    means for encrypting first data in a first smart card using a first key, wherein the first data is to be securely stored in a memory coupled to first and second supervisor cards, the first supervisor card having the first smart card and the second supervisor card having a second smart card, the first key being a master key generated by the first supervisor card;
    means for encrypting the first key in the first smart card using a second key to form a first encrypted key, the second key being a first sync key generated by the first supervisor card; and
    means for receiving in the first smart card, a second encrypted key from the second smart card, wherein the second encrypted key is formed by encrypting the first key using a third key, the third key being a second sync key generated by the second supervisor card.

14. A system for secure storage of data using multiple keys, the system comprising:
    a memory for storing the data, wherein the memory is coupled to first and second supervisor cards, the first supervisor card having a first smart card and the second supervisor card having a second smart card;

a random key generator for generating a first key to encrypt the data, the first key being a master key generated by the first supervisor card;

a first supervisor card for encrypting the data and the first key, wherein the first key is encrypted using a second key, the second key being a first sync key generated by the first supervisor card; and a second supervisor card for encrypting the first key using a third key, wherein the second supervisor card is a standby card for the first supervisor card, the third key being a second sync key generated by the second supervisor card.

15. The system of claim 14, wherein the first supervisor card further comprises:

a first transceiver for transmitting and receiving the data to and from the memory and the first smart card.

16. The system of claim 15, wherein the first smart card further comprises:

a first smart card memory;

a first key generator for generating a plurality of keys for encrypting the data, wherein one or more of the plurality of keys is stored in the first smart card memory;

a first encrypting module for encrypting information, the information including at least one of the data keys; and a first decrypting module for decrypting the information.

17. The system of claim 14, wherein the second supervisor card further comprises:

a second transceiver for transmitting and receiving the data to and from the memory and the second smart card.

18. The system of claim 17, wherein the second smart card further comprises:

a second smart card memory;

a second key generator for generating a plurality of keys for encrypting the data, wherein one or more of the plurality of keys is stored in the second smart card memory;

a second encrypting module for encrypting information, the information including at least one of the data keys; and a second decrypting module for decrypting the information.

19. An apparatus for secure storage of data using multiple keys, the apparatus comprising:

a processing system including a processor coupled to a display and user input device;

a computer-readable storage medium including instructions executable by the processor, the storage medium comprising:

one or more instructions for encrypting first data in a first smart card using a first key, wherein the first data is to be securely stored in a memory coupled to first and second supervisor cards, the first supervisor card having the first smart card and the second supervisor card having a second smart card, the first key being a master key generated by the first supervisor card;

one or more instructions for encrypting the first key in the first smart card using a second key to form a first encrypted key, the second key being a first sync key generated by the first supervisor card; and one or more instructions for receiving in the first smart card, a second encrypted key from the second smart card, wherein the second encrypted key is formed by encrypting the first key using a third key, the third key being a second sync key generated by the second supervisor card.

20. A computer-readable storage medium including instructions executable by a processor, the storage medium comprising:

one or more instructions for encrypting first data in a first smart card using a first key, wherein the first data is to be securely stored in a memory coupled to first and second supervisor cards, the first supervisor card having the first smart card and the second supervisor card having a second smart card, the first key being a master key generated by the first supervisor card;

one or more instructions for encrypting the first key in the first smart card using a second key to form a first encrypted key, the second key being a first sync key generated by the first supervisor card; and one or more instructions for receiving in the first smart card, a second encrypted key from the second smart card, the second encrypted key formed by encrypting the first key using a third key, the third key being a second sync key generated by the second supervisor card.

* * * * *